(12) United States Patent
Girones et al.

(10) Patent No.: US 6,454,198 B1
(45) Date of Patent: Sep. 24, 2002

(54) BELT ROLLER WITH A SWITCHABLE SPRING ARRANGEMENT

(75) Inventors: Jordi Pereira Girones, Barcelona; Pere Serraviñals Garcia, Vilanova del Valles; Gil Casanovas Font, Roda de Ter; Jordi Lombarte Meseguer, La Garriga, all of (ES)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/698,833

(22) Filed: Oct. 30, 2000

(30) Foreign Application Priority Data

Oct. 30, 1999 (DE) ............................. 199 52 371

(51) Int. Cl.⁷ ............................................. B60R 22/44
(52) U.S. Cl. ........................... 242/372; 242/375.1
(58) Field of Search ....................... 242/372, 375.1; 280/806, 807; 297/478

(56) References Cited

U.S. PATENT DOCUMENTS 4,917,324 A * 4/1990 Mori ........................ 242/372
4,993,657 A * 2/1991 Brown ..................... 242/372
5,452,862 A * 9/1995 Ray ......................... 242/372
5,964,427 A * 10/1999 Aiston ..................... 242/372

FOREIGN PATENT DOCUMENTS

EP  0 568 820 A1  11/1993

* cited by examiner

Primary Examiner—John M. Jillions
(74) Attorney, Agent, or Firm—R W Becker & Associates; R W Becker

(57) ABSTRACT

The present invention relates to a belt roller having a wind-up spring disposed between a housing part and a shaft onto which the belt is wound, the wind-up spring effecting wind-up rotation of the shaft, and a comfort spring serially actuable in connection with the wind-up spring via a ratchet gear and exerting a lesser spring force than the wind-up spring. A reduction drive is provided for switching between the wind-up spring and the comfort spring, the reduction drive having a follower gear for controlling a switch lever, whereby the reduction relationship of the reduction drive is arranged such that the rotation which begins with uncoiling of the belt and continues until the reaching of the switch point for switching the wind-up spring effects less than a complete rotation of the follower gear.

6 Claims, 3 Drawing Sheets

BELT ROLLER WITH A SWITCHABLE SPRING ARRANGEMENT

BACKGROUND OF THE INVENTION

The present invention relates to a belt roller having a wind-up spring disposed between a housing part and a shaft onto which the belt is wound, the wind-up spring effecting wind-up rotation of the shaft, and a comfort spring serially actuatable in connection with the wind-up spring via a ratchet gear and exerting a lesser spring force than the wind-up spring. The inner end of the comfort spring is secured to the shaft and the outer end of the comfort spring is secured to the ratchet gear. The inner end of the wind-up spring is secured to the ratchet gear and the outer end of the wind-up spring is secured to a housing part. A blocking link is provided for controlling the springs which is moveable into engagement with the ratchet gear and is selectively moveable into or out of engagement with the ratchet gear by operation of a switch element which effects the switching over between the springs. The switch element is comprised of a reduction drive having several toothed gears which mesh with one another and which is operable to displace a switch lever that controls the blocking link. The switch element, as a function of the number of rotations of the shaft following the beginning of the uncoiling of the belt, switches off the wind-up spring as it switches to the comfort spring and, during winding-up of the belt, the switch element switches back to the wind-up spring after a predetermined number of rotations of the shaft.

A belt roller with the above described features is disclosed in EP 0 568 820 A1; to the extent that two serially actuated springs of differing spring force are provided in known belt rollers, the belt retraction force which is exerted during the deployed condition of the belt when the belt is disposed across the shoulder of the seat inhabitant should be reduced due to the diminished dimensions of the comfort spring while the full force of the wind-up spring should be effective during wind-up of the belt after it has been unbuckled. The respective switching of the two springs is effected via a ratchet gear actuated in connection with such switching; the ratchet gear, during its blocking by means of a blocking link controlled by a switch element, operates such that only the comfort spring operates on the shaft during the blocking. In the state of the art representative belt roller described in EP 0 568 820 A1, the switch element is configured as a toothed gear device having three outer toothed gears meshable with one another; furthermore, there are engageable with the blocking lever driven by the toothed gear device, which comprises a portion of the switch element, an additional control gear, a pivotable follower gear, and a pull lever coupled with the additional control gear whose impact limits and controls the movement of the blocking link. Since additional springs are provided for the coupling of the components of the switch element, there is produced a complicated configuration of the switch element with numerous individual pieces whose assembly and adjustment for a correct usage is expensive.

SUMMARY OF THE INVENTION

The invention addresses the challenge of providing a belt roller having the appropriate components which simplify the configuration of the switch element for the switching to the respective spring and which assure the reliability of its operation such that, even in the event of unfavorable manufacturing tolerances and friction losses, the strength of the comfort spring is sufficient to ensure a switching back to the wind-up spring.

The solution to this challenge is shown in the advantageous embodiments and variations recited in the claims hereto which follow the descriptions of these embodiments and variations.

The invention provides a basic solution in which the portion of the reduction drive which engages the switch lever is configured as a follower gear for directly contacting the switch lever which extends along a peripheral region and which has a notch for engaging the switch lever, and in which the reduction relationship of the reduction drive is arranged such that the rotation of the shaft, which begins with the uncoiling of the belt and continues until reaching the switch point for switching from the wind-up roller as defined by the extension of the notch, is less than a full rotation of the follower gear, and, further, in which the range of the belt uncoiling, which is accomplished against the bias of the wind-up spring, is determined by the extension of the notch which maintains the blocking pawl out of engagement with the ratchet gear by means of the predetermined position of the switch lever. The advantage is tied in with the invention that, because of the preset large reduction relationship of the reduction drive of, for example, 40:1, the force needed from the relatively weaker comfort spring to effect a take-up of the belt is kept low; at the same time, the setting of the switchover time point effectuated by the notch which engages the switch lever is easy to configure and to operationally preset. In this regard, the invention comprises features that permit a definite switchover time point for switching to the comfort spring to be specified.

In accordance with one embodiment of the invention, it is provided that the outer teeth of the ratchet gear are configured and arranged such that, outside of the extension of the notch and the engagement of the blocking pawl during belt uncoiling, the blocking pawl slides over the outer teeth of the ratchet gear and then only engages the ratchet gear for switching to the comfort gear upon re-coiling or taking up of the belt in the wind-up direction.

It thus occurs that the further uncoiling of the belt, which follows an overrunning of the switchover time point that is specified by the configuration of the extension of the notch, must be performed against the bias of the wind-up spring because the blocking pawl slides away along the correspondingly configured outer teeth of the ratchet gear such that a fixation of the ratchet gear does not occur during this uncoiling of the belt. The outer teeth of the ratchet gear engage the blocking pawl, which has been pivotally biased against the periphery of the ratchet gear, only upon the beginning of a take-up or wind-up of the belt and the fixation of the ratchet gear at that time effects then a switching over to the comfort spring.

In accordance with an embodiment of the invention, a tensioning spring is provided for biasing the switch lever into its disposition in which it effects a switching over from the wind-up spring; the arrangement of this tensioning spring does not require any particular fine adjustment as the tensioning spring is kept out of its biasing function by means of the direct engagement of the notch with the wind-up spring which occurs during the belt uncoiling range as effectuated by the operation of the wind-up spring.

In accordance with an embodiment of the invention, the blocking pawl is biased by means of a spring toward the direction for engaging the outer teeth of the ratchet gear, and the spring that biases the switch lever is configured with a greater spring force than the spring that biases the blocking pawl.

Additionally, a pull lever can be provided which frictionally follows the shaft as it rotates during belt uncoiling and which maintains the blocking pawl out of engagement with the ratchet gear during the activated regime of the wind-up spring; in this manner, an advantageous noise reduction during the rotation of the shaft including the ratchet gear is ensured throughout those portions of the belt wind-up range or, respectively, the belt uncoiling range during which the wind-up spring is performing its biasing activity.

BRIEF DESCRIPTION OF THE DRAWINGS

The object and advantages of the present invention will appear more clearly from the following specification in conjunction with the accompanying drawings, in which.

DETAILED DESCRIPTION OF THE PREFERRED EMBODIMENTS

Figure 1:
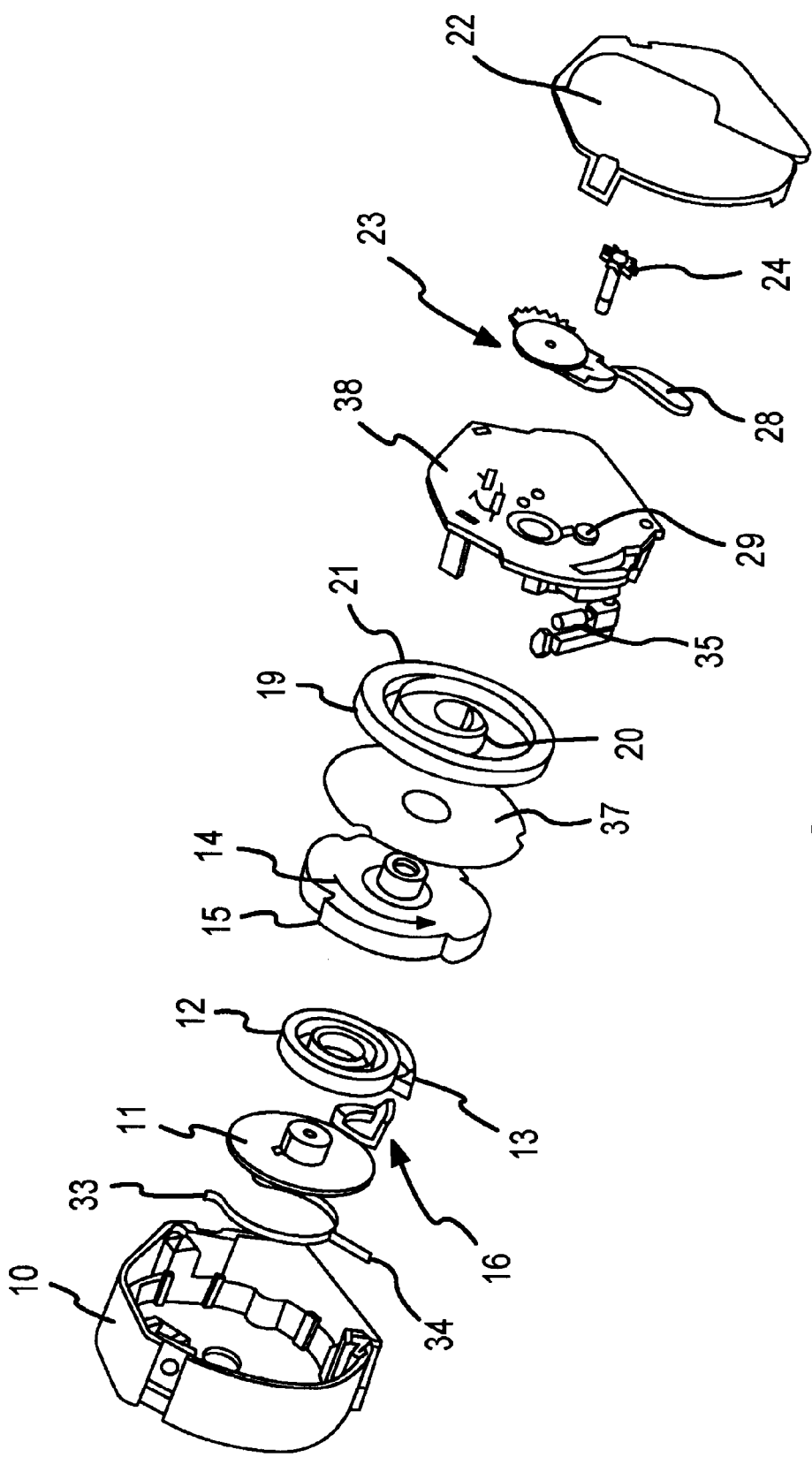
FIG. 1 is a perspective view of a belt roller showing the components thereof in an exploded view.

As seen initially in FIG. 1, the spring portion of a belt roller, which itself is not illustrated in further detail, is comprised of the following construction: within a housing 10 which encloses the spring portion, a spring core 11 is inserted in a form-fitted manner onto a corresponding extension of a shaft (not illustrated), and a comfort spring 12 is thereafter arranged on the shaft and includes an inner end secured to the spring core 11 so as to thereby be secured relative to the shaft, while an outer end 13 of the comfort spring 12 is secured to a ratchet gear 14 which is the next part which is axially sequentially mounted on the shaft extension. The ratchet gear 14 includes outer teeth 15 that mesh with a pivotably mounted blocking pawl 17 moveable between an engagement disposition and a release disposition.

A wind-up spring 19 is mounted on the shaft extension axially adjacent to the ratchet gear 14 and is separated from the ratchet gear by a separation plate 37, the inner end 20 of the wind-up spring being secured with the ratchet gear 14 and the outer end 21 of the wind-up spring being secured with a housing plate 38 which is mounted on and connected to the housing 10.

A gear 24 is mounted on the outside of the housing plate 38 which is configured to be form-fitted in a fixed manner to the shaft, the gear 24 being operable to bias a reduction drive 23 mounted relative to the gear for engagement thereby on the housing plate 38. The reduction drive 23, in turn, engages, in a manner to be shortly explained, a switch lever 28 mounted on the housing plate 38 upon a pivot 29, the switch lever 28 cooperating with movement elements on the inside of the housing plate 38 coupled with the blocking pawl 17 in the sense of controlling the blocking pawl's movement into or out of engagement with the outer teeth 15 of the ratchet gear 14.

Figure 2:
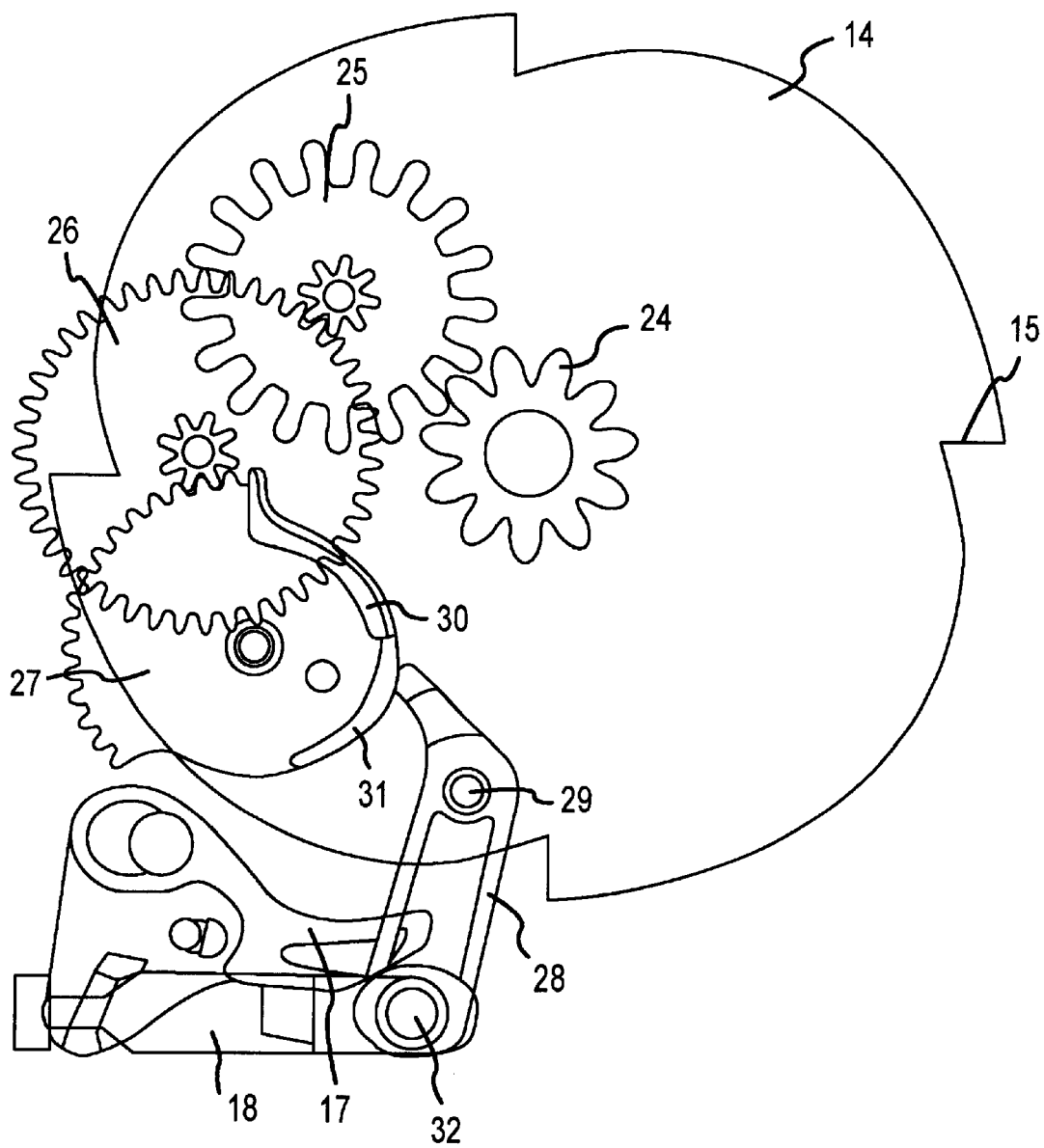
FIG. 2 is a schematic view of the reduction drive during the biasing operation of the wind-up spring.
Figure 3:
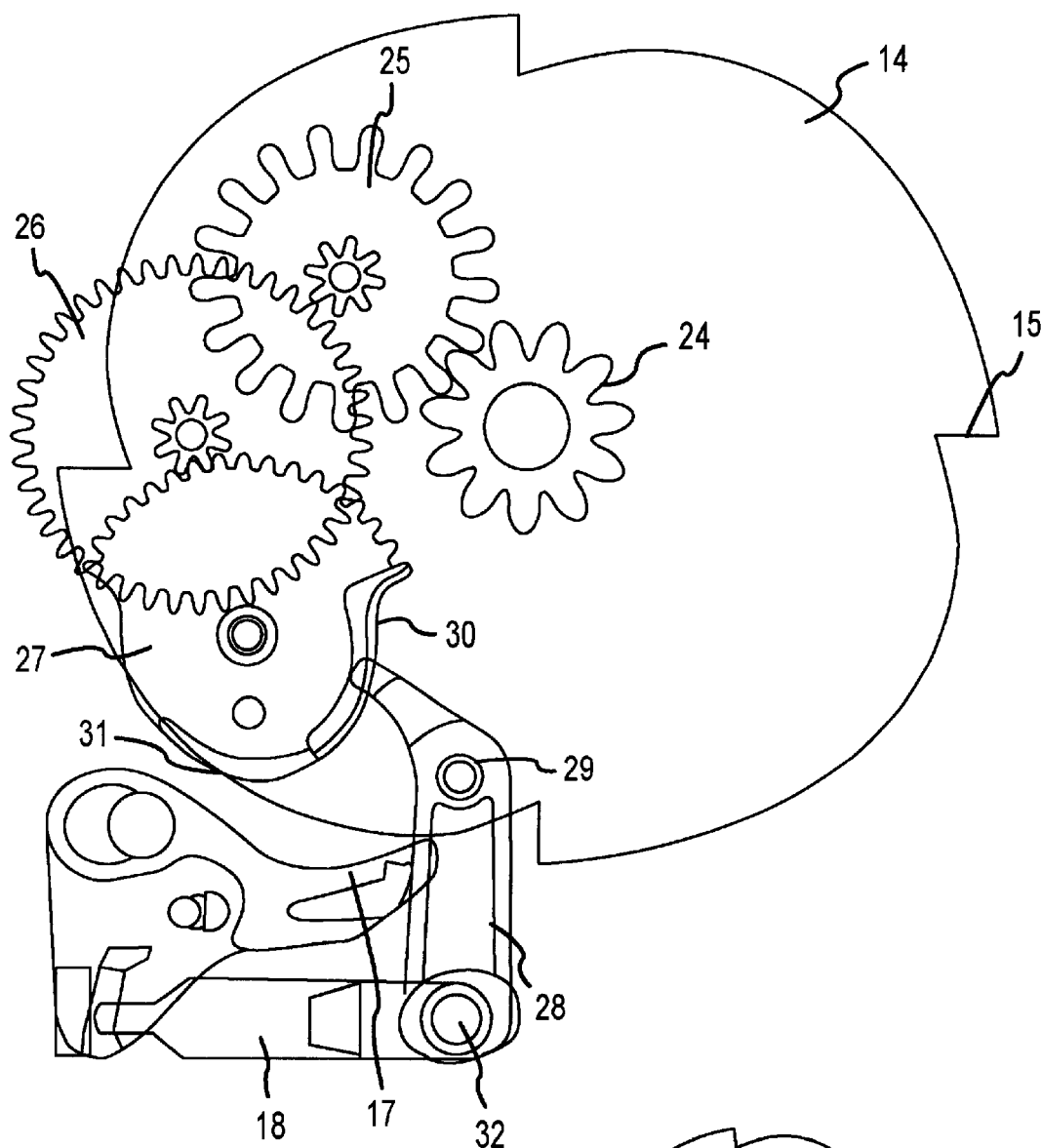
FIG. 3 is a schematic view of the reduction drive during sole operation of the comfort spring with the windup spring switched off from its biasing operation.

The switching control of the switch lever 28 is shown in detail in FIGS. 2 and 3, in which the individual components heretofore described are shown solely for the purpose of understanding their functioning.

The reduction drive includes, in addition to the gear 24, a second gear 25 and a third gear 26, whereby the gears 25, 26 are provided, respectively, with outer teeth as well as with an inner rack of additional outer teeth of small dimensions which cooperate with one another when the gears are disposed in opposed dispositions to one another to thereby configure the reduction drive 23 as a conventional reduction drive. A final member of the reduction drive is a gear segment 27 that is provided with gear teeth only along a portion thereof; the other portion of the gear segment is provided along its periphery with a notch 31 or, respectively, a groove 30, which cooperates with the apex of the switch lever 28. The end of the switch lever 28 which is opposite the other end thereof which is in engagement with the follower gear 27 is connected via a connector 32 with a push link 18 which is operable to pivot the switch lever 28 about its pivot 29 in correspondence with a pivoting movement of the blocking pawl 17. A movement translation mechanism such as this is conventionally known in connection with belt rollers.

Insofar as the switch condition illustrated in FIG. 2 is concerned, during which the wind-up spring 19 is operating in its belt biasing manner, it can be seen that the switch lever 28, by virtue of its disposition on the notch 31, is maintained in a disposition in which the switch lever 28, via the push link 18, maintains the blocking pawl 17 out of engagement with the outer teeth 15 of the ratchet gear 14. In this event, a rotation movement of the shaft at the commencement of a belt uncoiling movement leads, by virtue of the tensioned condition of the comfort spring 12 due to the paid out belt and to the free rotatable condition of the ratchet gear 14, to a tensioning of the wind-up spring 19, whereupon, in connection with a switchover to a winding-up of the belt in the illustrated disposition of the switch lever 28 in FIG. 2, the tensioned wind-up spring 19 effects a retracting rotation of the shaft via the tensioned comfort spring 12.

The belt uncoiling range or, respectively, the belt winding up range in which the afore-described operation of the wind-up spring 19 is effective is, in effect, predetermined by the peripheral extent of the notch 31 along which the apex of the switch lever 28 moves in a following manner as illustrated in FIG. 2.

Once the apex of the switch lever 28 reaches the end of the notch 31 due to the continued rotation of the follower gear 27, the apex of the switch lever 28 is urged by the biasing action of the pull spring 35 on the switch lever into the groove 30 which extends from the notch 31, whereupon the connector 32 of the switch lever 28, by virtue of the pivoting of the switch lever 28 about its pivot 29, is moved into the position shown in FIG. 3 and thereby effects movement, via the push link 18, of the blocking pawl 17 into its disposition on the outer periphery of the ratchet gear 14. Since the outer teeth 15 of the ratchet gear 14 are so configured that the blocking pawl 17 moved thereagainst is pushed outwardly relative to the outer teeth upon further rotation of the shaft in the belt uncoiling direction, this further shaft rotation does not yet lead to a locking engagement of the ratchet gear 14, whereby, during this further rotation in the belt uncoiling direction, there is not yet an actual switchover to the comfort spring; this condition solely sets up the switchover preparedness of the system.

If, in fact, a switchover to a belt wind-up movement occurs, the position of the ratchet gear 14 shown in FIG. 3 is now locked into the belt wind-up position and only the comfort spring 12 is thereby in a disposition to exert its biasing force with the inner end of the comfort spring secured to the shaft and the outer end 13 of the comfort spring applying biasing force to the ratchet gear 14 to which it is secured. To the extent that the apex of the switch lever 28 is disposed in following movement in the groove 30 of the follower gear 27 during belt uncoiling or belt wind-up movement, only the comfort spring 12 is disposed to perform its biasing action.

If the belt is released or unbuckled, a retraction rotation of the shaft begins which effects a following movement of the apex of the switch lever 28 along the notch 31 of the follower gear 27 in a relatively slow manner due to the predetermined large reduction relationship of 40:1, whereby the notch 31 moves the switch lever 28 into the disposition shown in FIG. 2 in which the wind-up spring 19 is disposed into its biasing operation.

Figure 4:
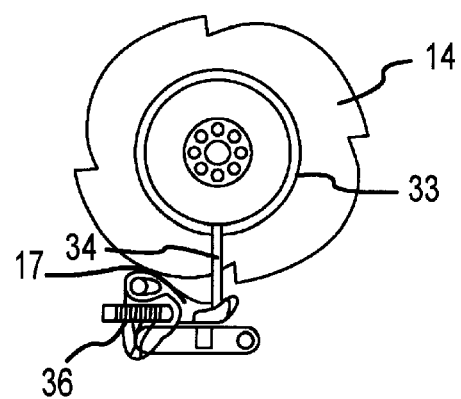
FIG. 4 is a view of the ratchet gear, the blocking pawl, and the noise reducing pull lever.

As can be seen in FIGS. 1 and 4, there is additionally provided a pull lever 33 having a spacing arm 34 which is maintained in engagement with the blocking pawl 17 during the belt uncoiling range driven by the wind-up spring 19 such that, during the associated rotation of the shaft and the ratchet gear 14, a flapping of the blocking pawl 17 against the outer teeth 15 of the ratchet gear 14 is avoided. Upon reaching of the comfort range, the pull lever 33 with its spacing arm 34 moves out of engagement with the blocking pawl 17 as a belt retraction gets underway, whereby the blocking pawl 17 is now controlled, as heretofore described, by the engagement of the switch lever 28 with the outer teeth 15 of the ratchet gear 14.

As can be seen in FIG. 4, a spring 36 is provided for biasing the blocking pawl 17 into engagement with the outer teeth 15 of the ratchet gear 14. The spring force of the spring 35 for biasing the switch lever 28 is greater than the spring force of the spring 36 for biasing the blocking pawl 17.

The features of the subject matter of the present invention, as set forth in the above description, the patent claims hereto, the abstract, and the figures of the drawings can be important individually as well as collectively in desired combination in the realization of the invention in its various embodiments.

The specification incorporates by reference the disclosure of German priority document 199 52 371.1 of Oct. 30, 1999.

The present invention is, of course, in no way restricted to the specific disclosure of the specification and drawings, but also encompasses any modifications within the scope of the appended claims.

What we claim is:

1. A belt roller comprising:

a ratchet gear;

a wind-up spring operable to bias a shaft in a wind-up rotation direction in which a belt is wound up onto the shaft, the wind-up spring having an inner end secured to the ratchet gear and an outer end secured to a housing;

a comfort spring having a spring force less than the wind-up spring having an inner end secured to the shaft and an outer end secured to the ratchet gear;

a blocking pawl moveable between a non-blocking position in which it does not block the rotation of the ratchet gear and a blocking position in which it blocks rotation of the ratchet gear so as to thereby lock the ratchet gear for rotation with the shaft such that the biasing action of the comfort spring is applied to the shaft; and a switch assembly for controlling the application of biasing force on the shaft by a selected one of the wind-up spring and the comfort spring, the switch assembly including a switch lever, a device for operatively connecting the switch lever to the blocking pawl for moving the blocking pawl between its non-blocking and blocking positions, and a reduction drive including a follower gear pivotably mounted on the ratchet gear, the reduction drive operatively interconnecting the shaft and the follower gear such that the follower gear rotates in correspondence with the rotation of the shaft at a predetermined reduced number of rotations relative to the number of rotations of the shaft, the switch assembly being operable to effect switching from the wind-up spring to the comfort spring in correspondence with the number of rotations of the shaft following an initial belt uncoiling and in connection with the commencement of a belt wind-up and to switch from the comfort spring to the wind-up spring in correspondence with a predetermined number of rotations of the shaft, the follower gear having a first follower portion along which the switch lever follows in a disposition such that the switch lever does not effect movement of the blocking pawl from its non-blocking position to its blocking position and a second follower portion along which the switch lever follows in another disposition such that the switch lever effects movement of the blocking pawl from its non-blocking position to its blocking position in which the comfort spring applies its biasing force to the shaft, the reduction relationship of the reduction drive being such that the follower gear is only partially rotated during that course of rotation of the shaft which extends from the beginning of an uncoiling of the belt until the switch lever moves in a following movement along the follower gear into its another disposition in which it effects movement of the blocking pawl from its non-blocking position to its blocking position in which the comfort spring applies its biasing force to the shaft, whereby the extent to which the wind-up spring maintains a biasing force on the shaft during an uncoiling of the belt is determined by the extent of the following movement of the switch lever along the first follower portion of the follower gear.

2. A belt roller according to claim 1, wherein the outer teeth of the ratchet gear are configured with respect to the blocking pawl such that the blocking pawl slides over the outer teeth without engaging the outer teeth throughout movement of the switch lever along the first follower portion of the follower gear and first engages the outer teeth upon a retracting rotation of the shaft whereby the biasing force applied to the shaft is switched from the wind-up spring to the comfort spring.

3. A belt roller according to claim 1, wherein the reduction relationship effected by the reduction drive is 40:1.

4. A belt roller according to claim 1, and further comprising a spring for biasing the switch lever into following engagement with the follower gear.

5. A belt roller according to claim 1, and further comprising a spring for biasing the blocking pawl into engagement with the outer teeth of the ratchet gear and the spring force of the spring for biasing the switch lever is greater than the spring force of the spring for biasing the blocking pawl.

6. A belt roller according to claim 1, and further comprising a pull lever for maintaining the blocking pawl out of engagement with the ratchet gearwhile the biasing force of the wind-up spring is applied to the shaft, the pull lever being disposed for frictional rotational following movement in correspondence with the rotation of the shaft.

\* \* \* \* \*